(12) United States Patent
Baker

(10) Patent No.: US 7,740,431 B1
(45) Date of Patent: Jun. 22, 2010

(54) TRUCK TIE-DOWN RECEIVING SYSTEM

(76) Inventor: Dennis J. Baker, 174 Country View Estates, Newville, PA (US) 17241

( * ) Notice: Subject to any disclaimer, the term of this patent is extended or adjusted under 35 U.S.C. 154(b) by 169 days.

(21) Appl. No.: 12/015,080

(22) Filed: Jan. 16, 2008

(51) Int. Cl.
*B60P 7/08* (2006.01)
(52) U.S. Cl. .................. 410/115; 410/106; 410/108
(58) Field of Classification Search ............. 410/106, 410/108, 110, 115, 116; 24/115 K; 296/39.2, 296/32, 41, 36, 37.6; 248/499
See application file for complete search history.

(56) References Cited

U.S. PATENT DOCUMENTS

| | | | |
|---|---|---|---|
| 4,253,785 A | * | 3/1981 | Bronstein .................. 410/110 |
| 4,818,006 A | | 4/1989 | Arndt |
| 4,909,559 A | | 3/1990 | Zettle |
| 5,364,211 A | | 11/1994 | Lund |
| 5,704,678 A | | 1/1998 | Elwell et al. |
| D451,878 S | | 12/2001 | Logan |
| 2002/0038962 A1 | | 4/2002 | Perez |

\* cited by examiner

*Primary Examiner*—Stephen Gordon

(57) ABSTRACT

A truck tie-down receiving system includes a pick-up truck that includes a cabin and a bed attached to the cabin. The bed includes a pair of lateral walls. Each of the lateral walls has an upper edge. A pair of mountings is provided and each of the upper edges has one of the mountings attached thereto. Each of the mountings has a plurality of apertures extending therethrough. Tie-down members may be extended through the apertures in the mountings to secure the tie-downs to the truck.

9 Claims, 6 Drawing Sheets

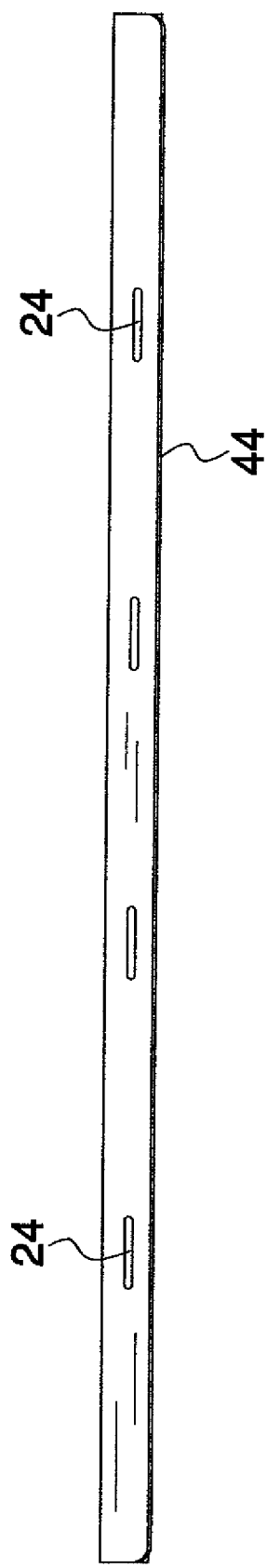
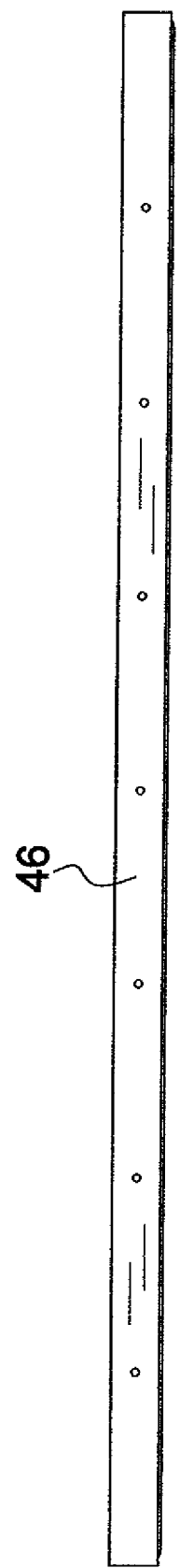
FIG. 3
FIG. 4

TRUCK TIE-DOWN RECEIVING SYSTEM

BACKGROUND OF THE INVENTION

Field of the Invention

The present invention relates to pickup bed tie down devices and more particularly pertains to a new pickup bed tie down device for allowing tie-down straps to be secured to a pickup bed's lateral walls.

SUMMARY OF THE INVENTION

The present invention meets the needs presented above by generally comprising a pick-up truck that includes a cabin and a bed attached to the cabin. The bed includes a pair of lateral walls. Each of the lateral walls has an upper edge. A pair of mountings is provided and each of the upper edges has one of the mountings attached thereto. Each of the mountings has a plurality of apertures extending therethrough. Tie-down members may be extended through the apertures in the mountings to secure the tie-downs to the truck.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a right side view of the mounting of the present invention.

FIG. 4 is a left side view of the mounting of the present invention.

DESCRIPTION OF THE PREFERRED EMBODIMENT

Figure 1:
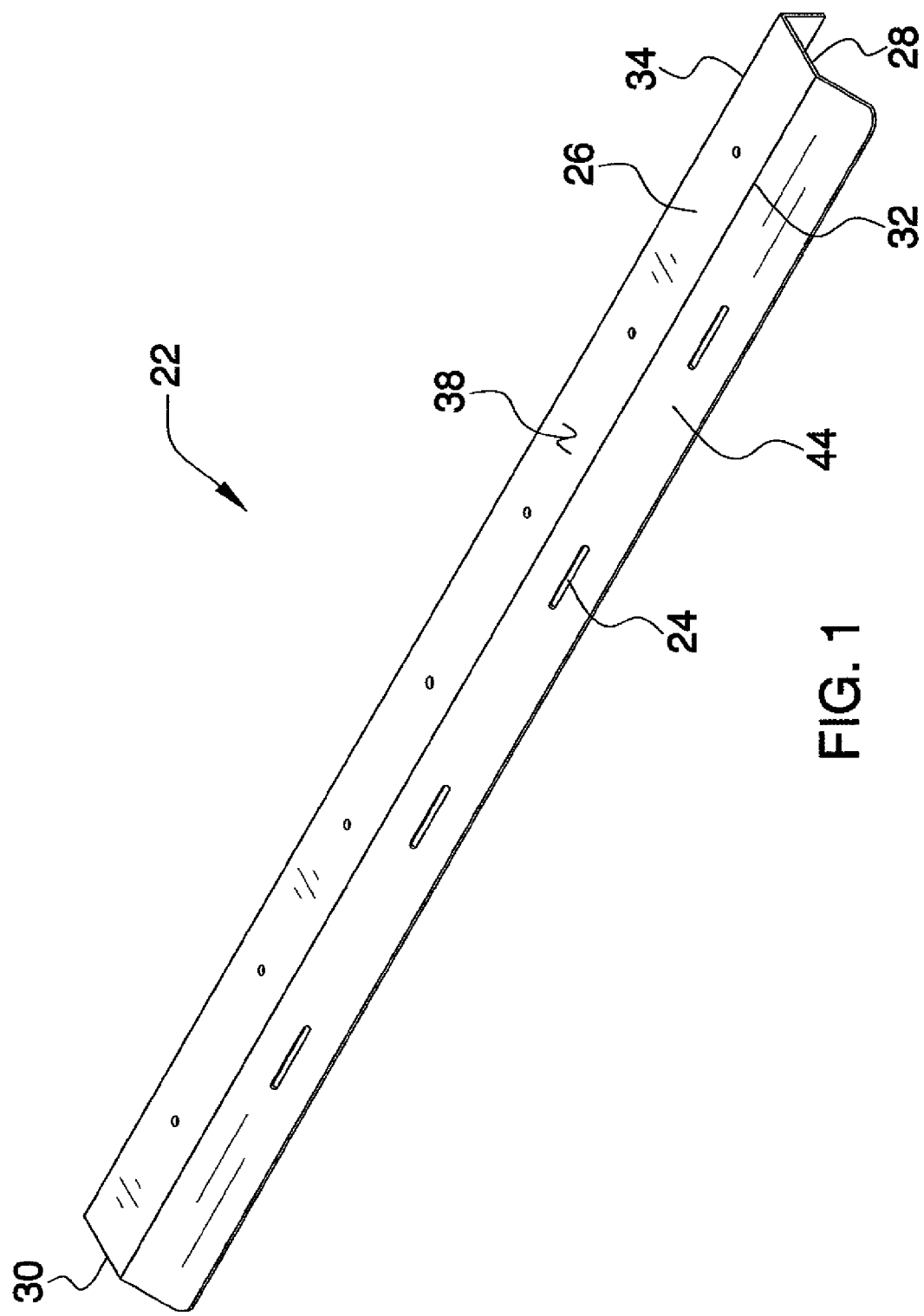
FIG. 1 is a top perspective view of a mounting of a truck tie-down receiving system according to the present invention.
Figure 2:
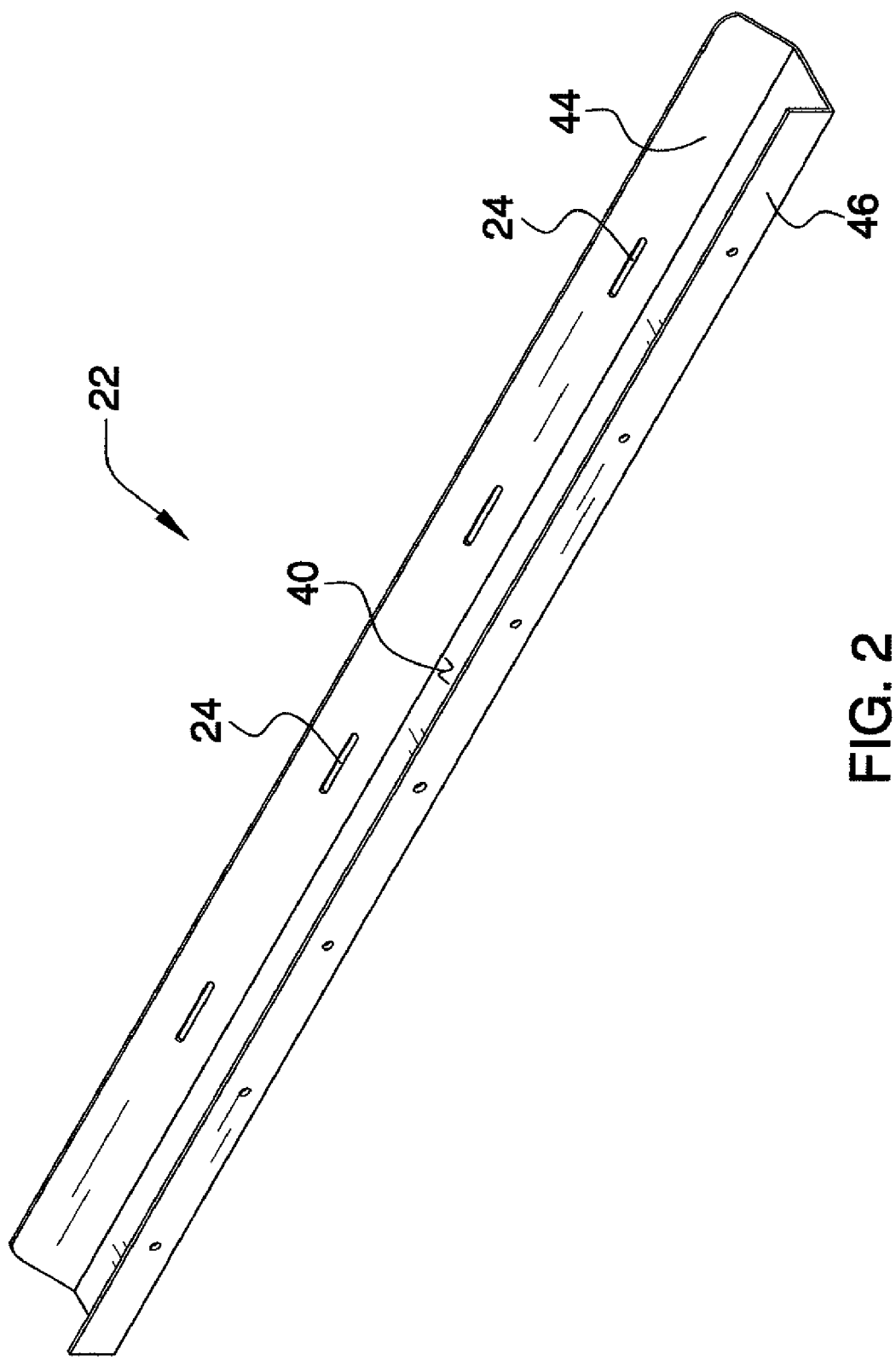
FIG. 2 is a bottom perspective view the mounting of the present invention.
Figure 5:
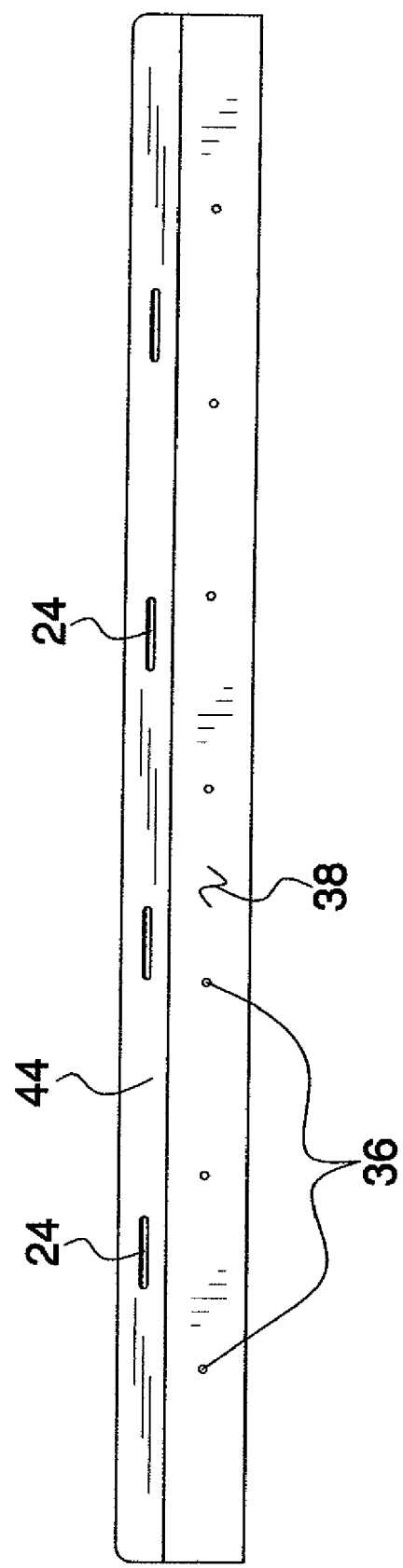
FIG. 5 is a top view of the mounting of the present invention.
Figure 6:
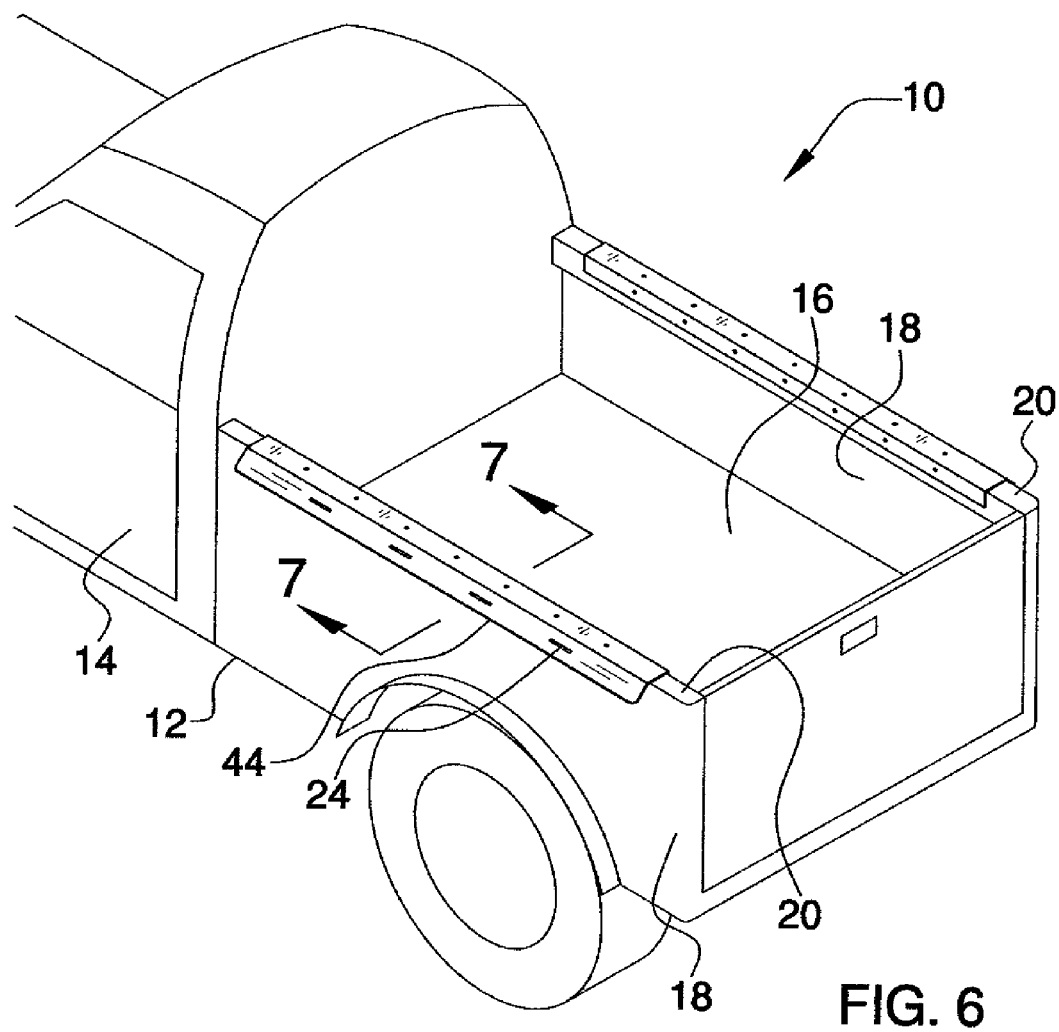
FIG. 6 is a top perspective view of the present invention.
Figure 7:
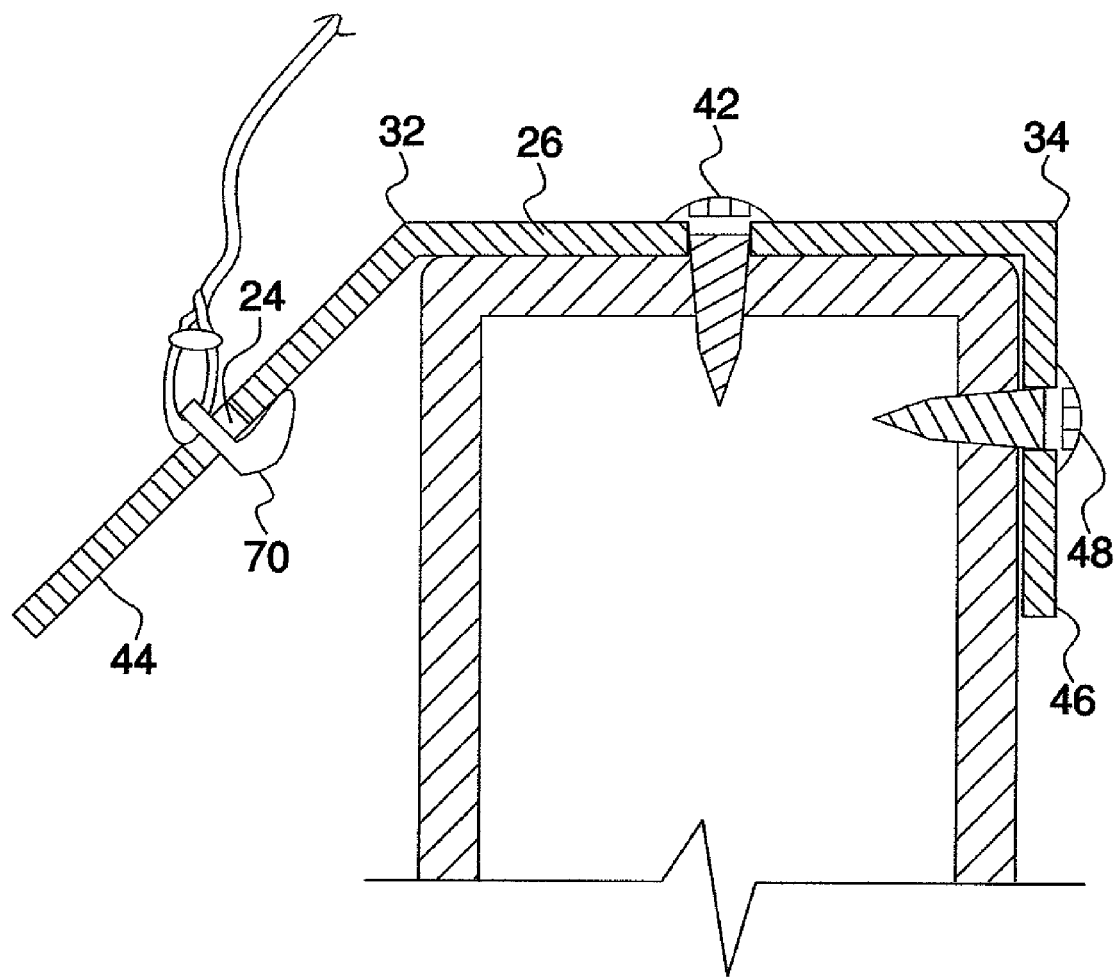
FIG. 7 is a cross-sectional view taken along line 7-7 of FIG. 6 of the present invention.

With reference now to the drawings, and in particular to FIGS. 1 through 7 thereof, a new pickup bed tie down device embodying the principles and concepts of the present invention and generally designated by the reference numeral 10 will be described.

As best illustrated in FIGS. 1 through 7, the truck tie-down receiving system 10 generally comprises a conventional pick-up truck 12 that includes a cabin 14 and a bed 16 attached to the cabin 14. The bed 16 includes a pair of lateral walls 18. Each of the lateral walls 18 has an upper edge 20.

A pair of mountings 22 is provided. Each of the upper edges 20 has one of the mountings 22 attached thereto. The mountings 22 each have a plurality of apertures 24 extending therethrough. Tie-down 70 members are extended through the apertures 24 in the mountings 22 to secure the tie-downs 70 to the truck 12.

Each of the mountings comprises an upper panel 26 that has a first end 28, a second end 30, a first lateral edge 32 and a second lateral edge 34. The upper panel 26 has a plurality of openings 36 therein extending into a top side 38 and outwardly of a bottom side 40 of the upper panel 26. The upper panel 26 has a length greater than 3 feet. A plurality of fasteners 42 is provided. Each of the openings 36 has one of the fasteners 42 extending therethrough. The fasteners 42 extend into the upper edge 20 of a respective one of the lateral walls 18.

The mountings 22 each include a lateral panel 44 that is attached to and coextensive with the first lateral edge 32. The lateral panel 44 extends away from a respective one of the lateral walls 18. The apertures 24 are positioned in the lateral panel 44 and the lateral panel 44 is angled downwardly from the upper panel 26. An angle between the lateral panel 44 and the bottom side 40 of the upper panel 26 is between 110 degrees and 150 degrees. The apertures 24 are elongated along a line oriented parallel to the first lateral edge 32.

A stabilizing panel 46 is attached to and extends along the second lateral edge 34 of the upper panel 26. The stabilizing panel 46 extends downwardly from the upper panel 26 and is oriented perpendicular to the upper panel 26. A plurality of fasteners 48 extends through the stabilizing panel 46 and into the respective one of the laterals walls 18.

In use, the upper panels 26 are attached to the lateral walls 18 of the pickup bed 16 as described above and shown in the Figures. Once attached to the lateral walls 18, the lateral panels 44 are used to secure tie-downs 70 to the lateral walls 18 to prevent objects from falling out of the pickup bed 16.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tie-down receiving system comprising:

a pick-up truck including a cabin and a bed attached to the cabin, said bed including a pair of lateral walls, each of said lateral walls having an upper edge;

a pair of mountings, each of said upper edges having one of said mountings attached thereto, each of said mountings having a plurality of apertures extending therethrough, wherein a plurality of tie-down members may be extended through said apertures in said mountings to secure the tie-down members to the truck, wherein each of said mountings comprises;

an upper panel having a first end, a second end, a first lateral edge and a second lateral edge, said upper panel having a plurality of openings therein extending into a top side and outwardly of a bottom side of said upper panel, said apertures being elongated along a line oriented parallel to said first lateral edge;

a plurality of fasteners, each of said openings having one of said fasteners extending therethrough, said fasteners extending into said upper edge of a respective one of said lateral walls; and a lateral panel being attached to and coextensive with said first lateral edge, said lateral panel extending away from a respective one of said lateral walls, said apertures being positioned in said lateral panel.

2. The system according to claim 1, wherein said lateral panel is angled downwardly from said upper panel.

3. The system according to claim 2, wherein an angle between said lateral panel and said bottom side of said upper panel is between 110 degrees and 150 degrees.

4. The system according to claim 1, wherein each of said mountings further includes a stabilizing panel being attached to and extending along said second lateral edge of a corresponding one of said upper panels, said stabilizing panel extending downwardly from said respective upper panel and being oriented perpendicular to said respective upper panel.

5. The system according to claim 4, wherein a plurality of fasteners extends through said stabilizing panel and into the respective one of said laterals walls.

6. A tie-down receiving system comprising:

a pick-up truck including a cabin and a bed attached to the cabin, said bed including a pair of lateral walls, each of said lateral walls having an upper edge;

a pair of mountings, each of said upper edges having one of said mountings attached thereto, each of said mountings having a plurality of apertures extending therethrough, wherein a plurality of tie-down members may be extended through said apertures in said mountings to secure the tie-down members to the truck, each of said mountings comprising;

an upper panel having a first end, a second end, a first lateral edge and a second lateral edge, said upper panel having a plurality of openings therein extending into a top side and outwardly of a bottom side of said upper panel, said upper panel having a length greater than 3 feet;

a plurality of fasteners, each of said openings having one of said fasteners extending therethrough, said fasteners extending into said upper edge of a respective one of said lateral walls;

a lateral panel being attached to and coextensive with said first lateral edge, said lateral panel extending away from a respective one of said lateral walls, said apertures being positioned in said lateral panel, said lateral panel being angled downwardly from said upper panel, an angle between said lateral panel and said bottom side of said upper panel being between 110 degrees and 150 degrees, said apertures being elongated along a line oriented parallel to said first lateral edge; and a stabilizing panel being attached to and extending along said second lateral edge of said upper panel, said stabilizing panel extending downwardly from said upper panel and being oriented perpendicular to said upper panel, a plurality of fasteners extending through said stabilizing panel and into the respective one of said laterals walls.

7. A tie-down receiving system comprising:

a pick-up truck including a cabin and a bed attached to the cabin, said bed including a pair of lateral walls, each of said lateral walls having an upper edge; and a pair of mountings, each of said upper edges having one of said mountings attached thereto, each of said mountings having a plurality of apertures extending therethrough, wherein a plurality of tie-down members may be extended through said apertures in said mountings to secure the tie-down members to the truck, each of said mountings comprises;

an upper panel having a first end, a second end, a first lateral edge and a second lateral edge, said upper panel having a plurality of openings therein extending into a top side and outwardly of a bottom side of said upper panel;

a plurality of fasteners, each of said openings having one of said fasteners extending therethrough, said fasteners extending into said upper edge of a respective one of said lateral walls;

a lateral panel being attached to and coextensive with said first lateral edge, said lateral panel extending away from a respective one of said lateral walls, said apertures being positioned in said lateral panel;

a stabilizing panel being attached to and extending along said second lateral edge of a corresponding one of said upper panels, said stabilizing panel extending downwardly from said respective upper panel and being oriented perpendicular to said respective upper panel a plurality of fasteners extends through said stabilizing panel and into the respective one of said laterals walls.

8. The system according to claim 7, wherein said lateral panel is angled downwardly from said upper panel.

9. The system according to claim 8, wherein an angle between said lateral panel and said bottom side of said upper panel is between 110 degrees and 150 degrees.

* * * * *